(12) United States Patent
Schoon et al.

(10) Patent No.: US 12,481,084 B2
(45) Date of Patent: Nov. 25, 2025

(54) SYSTEMS, METHODS, AND APPARATUS FOR THE OPERATION OF ELECTRONIC COMPONENTS AND THE DISPLAY OF INFORMATION RELATED TO AGRICULTURAL IMPLEMENTS

(71) Applicant: Kinze Manufacturing, Inc., Williamsburg, IA (US)

(72) Inventors: Jason Schoon, Williamsburg, IA (US); Ryan McMahan, Williamsburg, IA (US); Matthew Moeller, Williamsburg, IA (US); Matthew Achen, Williamsburg, IA (US); Bryton Hayes, Williamsburg, IA (US); Matthew Wilhelmi, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 947 days.

(21) Appl. No.: 17/650,778

(22) Filed: Feb. 11, 2022

(65) Prior Publication Data
US 2022/0260747 A1  Aug. 18, 2022

Related U.S. Application Data

(60) Provisional application No. 63/200,061, filed on Feb. 12, 2021.

(51) Int. Cl.
*G01V 13/00* (2006.01)
*A01C 7/10* (2006.01)
(Continued)

(52) U.S. Cl.
CPC .............. *G01V 13/00* (2013.01); *A01C 7/105* (2013.01); *G01V 8/00* (2013.01); *G06F 3/0484* (2013.01); *G06F 3/0488* (2013.01)

(58) Field of Classification Search
CPC .......... G01V 13/00; G01V 8/00; A01C 7/105; A01C 7/102; A01C 7/10; A01C 7/08;
(Continued)

(56) References Cited

U.S. PATENT DOCUMENTS

| 8,816,262 B2 | 8/2014 | Holland |
| 9,282,688 B2 | 3/2016 | Casper et al. |

(Continued)

FOREIGN PATENT DOCUMENTS

| AU | 2017355728 B2 | 5/2018 |
| BR | 112016024772 B1 | 8/2020 |

(Continued)

OTHER PUBLICATIONS

International Search Report and Written Opinion in PCT/US2023/062345, mailed Jun. 28, 2023, 10 pages.

*Primary Examiner* — Christopher J. Novosad
(74) *Attorney, Agent, or Firm* — McKee, Voorhees & Sease, PLC (57) ABSTRACT

A display unit is connected to an agricultural implement to provide inputs and operational controls, as well as status and set up, of the implement. The display unit can be a touchscreen or other device that can receive inputs to set up, control, store information, and recall information associated with the operation of the agricultural implement. The display unit can provide a number of different types of inputs to allow for the control of the various components of the implement. Information shown, tracked, managed, communicated, or otherwise used by the system can be selected and set up by a user to customize the experience and to provide additional information useful for agricultural operations.

9 Claims, 9 Drawing Sheets

(51) Int. Cl.
*G01V 8/00* (2006.01)
*G06F 3/0484* (2022.01)
*G06F 3/0488* (2022.01)

(58) Field of Classification Search
CPC ......... A01C 7/00; G06F 3/0484; G06F 3/048; G06F 3/01; G06F 3/0487; G06F 3/0488
See application file for complete search history.

(56) References Cited

U.S. PATENT DOCUMENTS

| | | | |
|---|---|---|---|
| 9,285,501 B2 | 3/2016 | Christy et al. | |
| 9,554,098 B2 | 1/2017 | Casper et al. | |
| 9,585,307 B2 | 3/2017 | Holland | |
| 9,903,979 B2 | 2/2018 | Dybro et al. | |
| 10,028,426 B2 | 7/2018 | Schildroth et al. | |
| 10,188,037 B2 | 1/2019 | Bruns et al. | |
| 10,393,712 B2 | 8/2019 | Li | |
| 10,670,763 B2 | 6/2020 | Rhodes et al. | |
| 10,788,419 B2 | 9/2020 | Thompson | |
| 11,266,056 B2 | 3/2022 | Nair et al. | |
| 2002/0043194 A1 | 4/2002 | Kinzenbaw et al. | |
| 2004/0206281 A1 | 10/2004 | Wilson | |
| 2010/0313297 A1 | 12/2010 | Sosa et al. | |
| 2011/0160994 A1 | 6/2011 | Schmidt et al. | |
| 2014/0000919 A1* | 1/2014 | Bachman | A01B 63/114 172/4 |
| 2016/0029547 A1 | 2/2016 | Casper et al. | |
| 2017/0042081 A1 | 2/2017 | Zumbach et al. | |
| 2018/0032776 A1 | 2/2018 | Ekins et al. | |
| 2019/0278262 A1 | 9/2019 | Taylor et al. | |
| 2020/0253107 A1 | 8/2020 | Madison et al. | |
| 2021/0144911 A1 | 5/2021 | Plattner | |
| 2021/0243945 A1 | 8/2021 | Schmidt et al. | |
| 2021/0394777 A1 | 12/2021 | Brocke et al. | |
| 2022/0055963 A1 | 2/2022 | Shirley, Jr. et al. | |
| 2022/0346304 A1 | 11/2022 | Allgaier | |
| 2023/0247935 A1 | 8/2023 | Gupta et al. | |

FOREIGN PATENT DOCUMENTS

| | | | | |
|---|---|---|---|---|
| CN | 1086489 A | * | 5/1994 | ............. A01C 7/105 |
| CN | 105319172 B | | 2/2018 | |
| CN | 210199886 U | * | 3/2020 | ............. G07F 13/04 |
| DE | 102015105790 A1 | | 10/2016 | |
| EP | 3490376 A4 | | 12/2019 | |
| GR | 1009533 B | | 5/2019 | |
| GR | 1009606 B | | 9/2019 | |
| WO | 2016154482 A1 | | 9/2016 | |

* cited by examiner

SYSTEMS, METHODS, AND APPARATUS FOR THE OPERATION OF ELECTRONIC COMPONENTS AND THE DISPLAY OF INFORMATION RELATED TO AGRICULTURAL IMPLEMENTS

CROSS REFERENCE TO RELATED APPLICATIONS

This application claims priority under 35 U.S.C. § 119 to provisional patent application U.S. Ser. No. 63/200,061 filed Feb. 12, 2021. The provisional patent application is herein incorporated by reference in its entirety, including without limitation, the specification, claims, and abstract, as well as any figures, tables, appendices, or drawings thereof.

FIELD OF THE INVENTION

Aspects of the disclosure are directed generally towards a control and/or display unit including an interactive graphical user interface showing operations related to one or more agricultural implements and providing data and other feedback related to the same. The disclosure includes methods, systems, and apparatus for acquiring, storing, receiving, communicating, and configuring information related to an agricultural implement and performing instructions, operations, and other outputs based upon the same.

BACKGROUND OF THE INVENTION

Agricultural implements perform a variety of agricultural operations. For example, an agricultural row crop planter is a machine built for precisely distributing seed into the ground. The row crop planter generally includes a horizontal toolbar fixed to a hitch assembly for towing behind a tractor or other implement. Row units are mounted to the toolbar. In different configurations, seed may be stored at individual hoppers on each row unit, or it may be maintained in a central hopper and delivered to the row units on an as needed basis. The row units generally include ground-working tools for opening and closing a seed furrow, and a seed metering system for distributing seed to the seed furrow.

In its most basic form, the seed meter includes a housing, a seed disk, and a seed delivery system, which facilitates movement of metered seed towards a furrow. The housing is constructed such that it creates a reservoir to hold a seed pool. The seed disk resides within the housing and rotates to pass through the seed pool where it picks up individual seeds. The seeds are subsequently dispensed into the seed chute where they drop into the seed furrow. The seed meters are given a location along a toolbar of a planter, and the location determines at least some functionality of the meter.

Because the planter is generally pulled by a tractor or other tow vehicle with an operator remote from the planter, it may be desirable for an operator to view data associated with the operation of the planter in order for the operator to know information related to the planting of one or more types of seed. This information can ensure that desirable agronomical parameters associated with the planting of the particular type of seed are being met and/or maintained by settings of the planter. This would allow the operator to update, on-the-fly, any such setting of the planter to within such an acceptable parameter.

Still further, it may be desirable to view other data, sensor information, or other settings related to the planter and/or planting of the seed in order to track and store the information for a later use. This may include the review of the data during or after the growing season, such as at harvest, to aid in providing updated agronomical information to be used in future years and to aid in increasing the yield of planted seed.

Therefore, there is a need in the art for a control and/or display unit in communication with an agricultural implement, such as a planter, including the individual components thereof, in which the unit is able to display information related to one or more agricultural operations, provide an interface to update one or more settings of the implement, to record and store data associated with one or more operations, to customize selections for display and/or operation, to operate, such as by calibrating or otherwise optimize components associated with the planter, and/or to provide for communication to one or more additional devices for communicating any of the information related to the agricultural implement and/or farming operation.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is another object, feature, and/or advantage of the disclosure to provide systems, methods, and/or apparatus for providing monitoring, storing, and inputting in a display unit in communication with an agricultural implement.

It is still yet a further object, feature, and/or advantage to provide controls for various features, systems, and/or components of an agricultural implement. This can include, but is not limited to, calibration, optimization, testing, cleanout, and the like, for any of the components and/or systems or assemblies of an implement.

It is yet another object, feature, and/or advantage to provide a customizable display for any and/or all of the operations and/or components of an agricultural implement. The displays can show real time information, historical information, shared information, and/or tracked information for different categories.

It is still another object, feature, and/or advantage to provide a display and system for an agricultural implement that provides feedback, such as in the form of warnings, shutoffs, and other troubleshooting in an automatic, customizable, or combined manner.

The system, methods, and/or apparatus disclosed herein can be used in a wide variety of applications. For example, while the system is used with respect to an agricultural implement, this can be meant to include any number of implements, including, but not limited to planting implements, spraying implements, tillage implements, and/or other ground engaging implements.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an agricultural implement incorporating any of the objects and/or features disclosed, which accomplish some or all of the previously stated objectives.

The aspects and/or features disclosed can be incorporated into systems which accomplish some or all of the previously stated objectives. These can be standalone systems, existing systems/displays, remote systems/displays, or any combination or variation thereof.

According to some aspects of the present disclosure, a method for calibrating an agricultural sensor comprises activating the sensor based on input provided by a user via a display, and calibrating the sensor.

According to at least some aspects of the embodiments disclosed, the method further comprises presenting an output on the display indicating that the sensor is calibrated and/or is ready to be used.

According to at least some aspects of the embodiments disclosed, the calibration step further comprises determining a proper sensitivity level needed by the sensor for the sensor to function properly.

According to at least some aspects of the embodiments disclosed, the sensor comprises a transmitter, receiver, and/or transceiver, and the proper sensitivity level needed by the sensor is based on the cleanliness of one or more of the transmitter, receiver, and/or transceiver.

According to at least some aspects of the embodiments disclosed, the calibration step further comprises adjusting a sensitivity level of the sensor until an actual result of the sensor matches an expected result of the sensor.

According to at least some aspects of the embodiments disclosed, the agricultural sensor comprises one or more agricultural sensors.

According to at least some aspects of the embodiments disclosed, a computer-implemented self-calibration system for use with an agricultural implement comprises one or more agricultural sensors located on the agricultural implement, and a display in communication with the agricultural implement and/or the one or more agricultural sensors, wherein a user can offer input to the display to calibrate the one or more agricultural sensors, wherein, upon input to calibrate the one or more agricultural sensors being offered via the display, the system calibrates the one or more agricultural sensors.

According to at least some aspects of the embodiments disclosed, the agricultural implement is a planter comprising a plurality of row units, each row unit comprising a seed meter, and each seed meter comprising a seed tube, wherein the one or more agricultural sensors are located in the plurality of seed tubes and are used to detect seed being planted.

According to at least some aspects of the embodiments disclosed, the display is and/or comprises an intelligent control and/or a user interface.

According to at least some aspects of the embodiments disclosed, the one or more agricultural sensors are included as part of one or more modules located on the agricultural implement.

According to at least some aspects of the embodiments disclosed, the system is adapted to calibrate all of the one or more agricultural sensors or a selection of the one or more agricultural sensors, wherein the user may select the selection via the display.

According to at least some aspects of the embodiments disclosed, wherein the system further comprises a tow vehicle, such as a tractor, to tow the agricultural implement.

According to at least some aspects of the embodiments disclosed, after the one or more agricultural sensors have been calibrated, the system is adapted to provide an output to the display indicating that the one or more agricultural sensors have been calibrated and/or are ready to be used.

According to at least some aspects of the embodiments disclosed, the system is adapted to determine one or more proper sensitivity levels needed by each of the one or more agricultural sensors for each of the agricultural sensors to function properly, further wherein each of the agricultural sensors comprises a transmitter, receiver, and/or transceiver, and each of the proper sensitivity levels needed by each of the agricultural sensors is based on the cleanliness of one or more of each of the one or more of the transmitters, receivers, and/or transceivers.

According to at least some aspects of the embodiments disclosed, the system is adapted to adjust a sensitivity level of each of the one or more agricultural sensors until an actual result of each agricultural sensor matches an expected result of each agricultural sensor.

According to at least some aspects of the embodiments disclosed, a display unit for use with one or more agricultural sensors comprises a user interface adapted to allow a user to enter inputs wherein a user can enter input via the user interface to calibrate the one or more agricultural sensors, and wherein when said input to calibrate the one or more agricultural sensors is entered via the user interface, the display unit communicates with the one or more agricultural sensors to calibrate the one or more agricultural sensors.

According to at least some aspects of the embodiments disclosed, the display unit further comprises an intelligent control.

According to at least some aspects of the embodiments disclosed, the display unit is portable and wireless.

According to at least some aspects of the embodiments disclosed, the user interface is colorized and comprises a touchscreen.

According to at least some aspects of the embodiments disclosed, after the one or more sensors have been calibrated, the system is adapted to provide an output to the display unit indicating that the one or more sensors have been calibrated and/or are ready to be used These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The term "agricultural equipment" encompasses any type of machinery associated with the agriculture industry. For example, both agricultural vehicles and agricultural implements are encompassed by the term "agricultural equipment".

The term "particulate material" shall be construed to have a broad meaning, and includes, but is not limited to grain, seed, fertilizer, insecticide, dust, pollen, rock, gravel, dirt, stock, or some combination thereof. Particulate material can be mixed with air to form airborne matter.

As will be understood, aspects and/or embodiments disclosed herein relate generally to the control, display, tracking, monitoring, communicating, calibrating, and/or setup of one or more components, such as electrical components, associated with agricultural implements. For example, the systems, methods, and/or apparatus disclosed may be used with agricultural planting implements.

Figure 1:
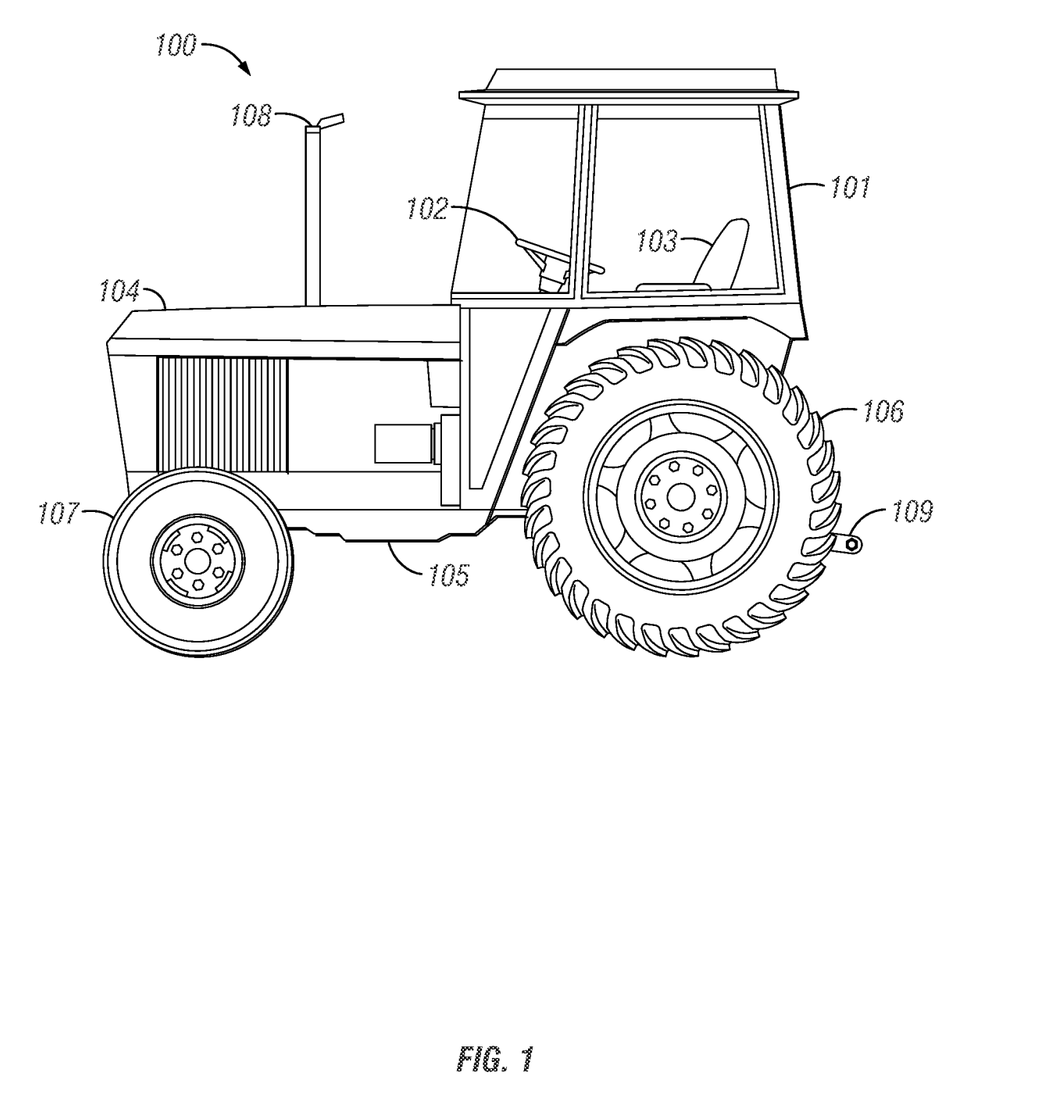
FIG. 1 is a side elevation view of an exemplary tractor.

It should be appreciated that the disclosure, including any or all of the components disclosed herein, may be used with respect to a planter, but this should not be limiting to the disclosure. FIG. 1 shows a tractor 100 used to deliver high torque, for the purposes of hauling machinery used in agriculture. The tractor 100 includes a cab 101 with a steering wheel 102 and a seat 103 for an operator. The tractor 100 also includes a vehicle frame 104 which houses an engine located near the front axle of the tractor 100 and in front of the cab 101. The cab 101 and vehicle frame 104 are supported, structurally, by the tractor's chassis 105, which attaches to rear drivable wheels 106 and front steerable wheels 107, said front steerable wheels 107 operationally connected to the steering wheel 102. An exhaust pipe 108 allows carbon monoxide to exit the tractor 100 during operation of the engine. A tractor hitch 109 allows for connection between agricultural machinery and the tractor 100.

Figure 2:
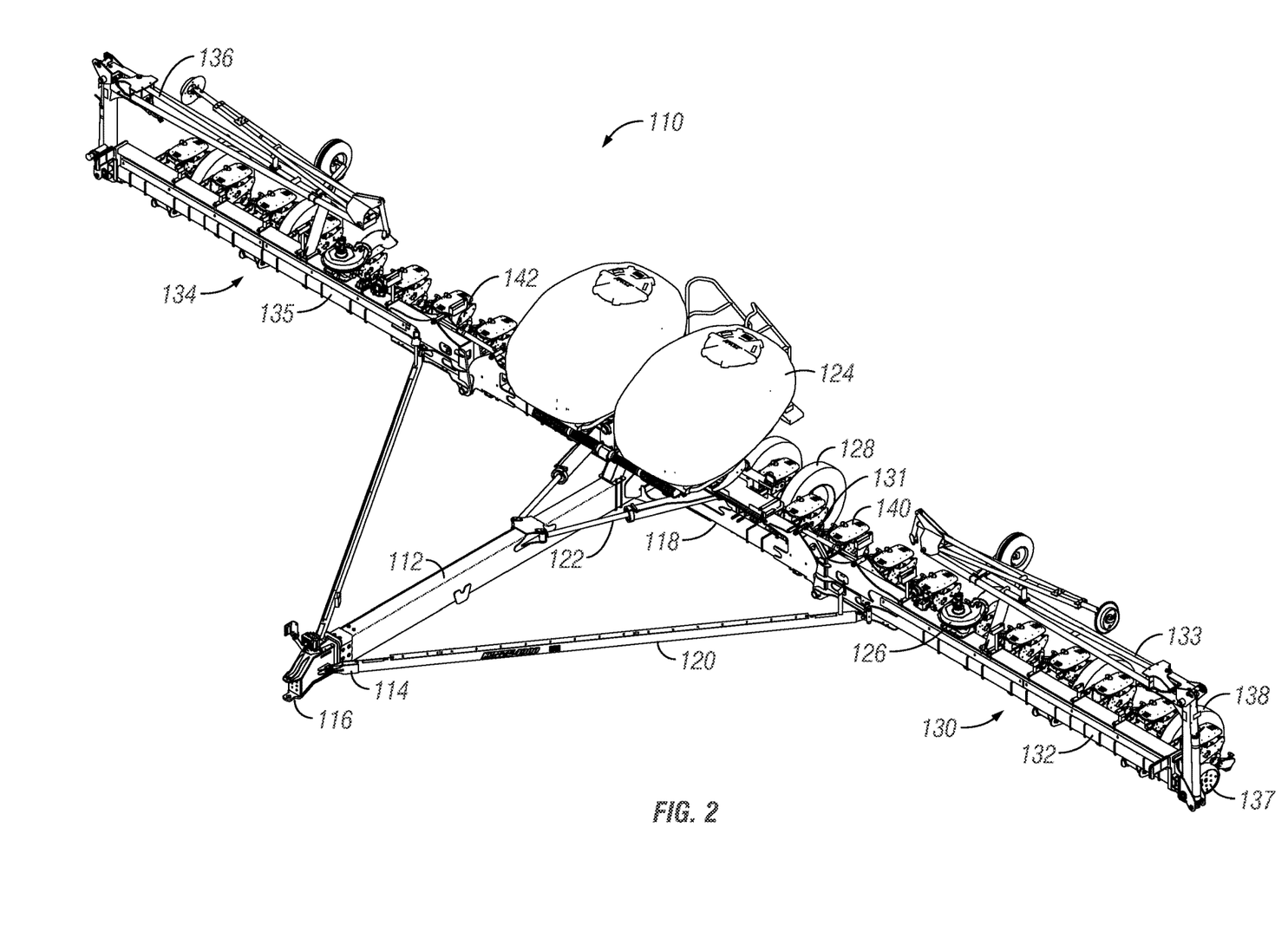
FIG. 2 is a perspective view of an agricultural planter.

FIG. 2 shows a planter 10 used to plant and fertilize seed in a controlled manner. For example, the planter 10 as shown in FIG. 2 includes a tongue 12, which may be telescoping. The tongue 12 includes a first end 114 with an implement hitch 16 for attaching to a tow vehicle, such as the tractor 100. The opposite end of the tongue 12 is attached to a frame or central toolbar 18. Draft links 20 are connected between the central toolbar 18 and the tongue 12 and are used in conjunction with folding actuators 22 to fold the central toolbar 18 in a frontward manner. Therefore, the tongue 12 may be a telescoping tongue in that it can extend or track to allow for the front folding of the central toolbar 18. The planter 10 may also be a lift and rotate, rear fold, vertical fold, narrow row, or generally any other type of planter.

The central toolbar 18 includes first and second wings 30, 34 extending therefrom. The central toolbar 18 includes central hoppers 24 which contain seed or other granules/particulate used with planting. A plurality of transport wheels 28 also are connected to the central toolbar 18. The first and second wings 30, 34 are generally mere images of one another. The wings include first and second wing toolbars 32, 35. Attached along the central toolbar 18 as well as the first and second wing toolbar 32, 35, are a plurality of row units 40. The row units include seed meters 42, ground engaging tools, and/or other components used for planting, tilling, and fertilizing seed in a controlled manner. Also connected to the first and second wings 30, 34 are first and second markers 33, 36. The markers include actuators 37 which are used to raise and lower the markers 33, 36. The markers 33, 36 can be lowered to provide guidance for the edge of a planter for use in planting. When not required, the markers can be lifted to a position as that shown in FIG. 2 to move the markers out of the way.

Also shown in FIG. 2 are a plurality of fans 26 as well as a plurality of wheels 38. The wings may also include actuators 31 to raise and lower or otherwise provide a downward force on the wings. Therefore, as is shown in FIG. 2, there are a multiplicity of components of the planting implement 10. The components may include moving parts, such as the actuators used to move the wings, markers, row units, etc., while also providing additional functions. For example, the fans 26 are used to provide a pressure in the seed meters 42 to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 40. Lights may also be included as part of the planter.

Additionally, an air seed delivery system may be provided between the central hoppers 24 and any plurality of seed meters 42 on the row units 40 in that the air seed delivery system provides a continued flow of seed to the row units on an as needed manner to allow for the continuous planting of the seed via the seed meters on the row units. Thus, the various controls of the planter may require or otherwise be aided by the use of an implement control system. The implement control system can aid in controlling each of the functions of the implement or planter 10 so as to allow for the seamless or near seamless operation with the implement, and also provides for the communication and/or transmission of data, status, and other information between the components.

As will be appreciated, the planter need not include all of the features disclosed herein and may also include additional or alternative features as those shown and/or described. The foregoing has been included as an exemplary planter, and it should be appreciated that generally any planter from any manufacturer and any add-ons or aftermarket components may be included in any planter that encompasses any of the aspects of the invention.

Therefore, a planter 10 such as that shown, can be pulled by the tow vehicle, such as the tractor 100 of FIG. 1. In addition, the planter 10 could be pulled by a self-propelled, autonomous tug unit, rather than an operator-driven vehicle, such as the tractor, such as the one shown and described in co-owned U.S. Pat. No. 10,575,453, which is herein incorporated by reference in its entirety. The rear drivable wheels and front steerable wheels can be substituted for tracks, regardless of whether said tracks are implemented on an operator-driven vehicle or a self-propelled vehicle.

Aspects of the operation of the planter 10, including any operation associated with any of the electronic or mechanical components thereof, can be controlled and/or viewed on a display unit, which may be positioned in the cab of the tractor or located remote of the planter and/or tractor. The display unit may also be referred to as a user interface unit, monitor and input unit, monitor unit, interactive display, or other relative term. The display unit is configured to be used with an agricultural implement, while being remote from an agricultural implement. For example, it is contemplated that the display unit be in communication, such as electronic communication, with a planter. An operator can utilize the display unit remote from the planter, such as in a tractor or other tow vehicle that is connected to the planter. The display unit can be displayed within the tow vehicle, but is also configured to be removable therefrom, thus creating a portable unit.

The display unit can take many forms and can generally be considered or can comprise an intelligent control and a user interface. For example, an intelligent control is generally considered to be a computer readable medium or computing device or an apparatus including a processing unit. Examples of such units can be tablets, computers, servers, cell phones, or generally any other handheld, portable, permanent, or other device which may include a central processing unit and a graphical user interface ("GUI"). The graphical user interface may also be a user interface ("UI") without the graphics required. A user interface is how the user interacts with a machine. The user interface can be a digital interface, a command-line interface, a graphical user interface ("GUI"), oral interface, virtual reality interface, or any other way a user can interact with a machine (user-machine interface). For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, speakers, microphones, LIDAR, RADAR, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

Additional aspects of the display unit can include connections to wires to be able to communicate electronically to the planter. Still further, it is contemplated that the unit be communicated in a wireless fashion, such as any wireless connection. This can include, but is not limited to Bluetooth, Wi-Fi, cellular data, radio waves, satellite, or generally any other form of wireless connection which will allow for communication between the unit and the planter. Therefore, the unit will include generally any electronic components necessary to allow for such wireless or wired communication. The wired communication can take the form of CAN bus, Ethernet, co-axial cable, fiber optic line, or generally any other line which will allow for communication between the unit and the implement and/or planter.

Figure 3:
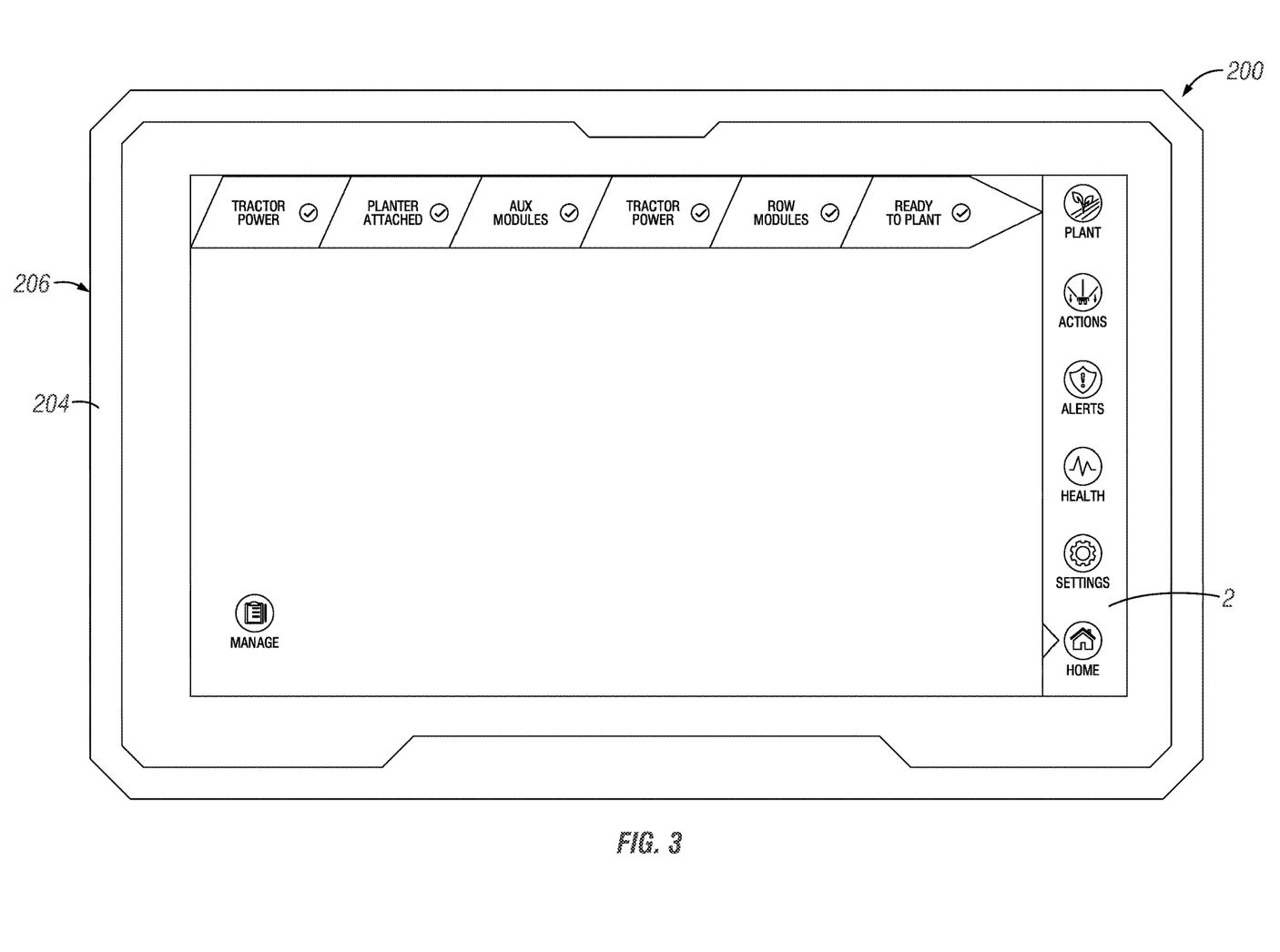
FIG. 3 is an exemplary view of a display unit for use with an agricultural planting implement.

An exemplary depiction of a display unit 200, such as may be used with any or all of the aspects and/or embodiments disclosed herein is shown generally in FIG. 3. It should be appreciated, as had been disclosed, that the display 200 shown in FIG. 3 is for exemplary purposes and is not to be limiting on the invention. However, as shown, the display 200 includes a screen area 202 surrounded by a fascia or frame 204, which may be a part of the housing 206 of the display 200. The display 200 shown in FIG. 3 and others includes a colorized, graphical user interface, showing both colorized icons and images. In addition, it is noted that the display 200 shown in the figures is a touchscreen, allowing the display 200 to be interfaced via a touch by a user. This could be with an appendage, such as a finger, or a conduit, such as a stylus or other device. In the configuration shown, the housing/fascia 206/204 does not include any interfaces, such as inputs, but it is envisioned that buttons, knobs, or the like be included in the housing 206 outside of the display 200 to provide inputs and other interfaces for controlling and/or inputting information with the display 200.

Additionally, while not shown, it is to be appreciated that the display unit 200 includes a processor, non-transitory computer readable medium, modules/programs, memory, operating system, database, power, communications/networks, and/or a number of inputs and/or outputs.

In communications and computing, a computer readable medium is a medium capable of storing data in a format readable by a mechanical device. The term "non-transitory" is used herein to refer to computer readable media ("CRM") that store data for short periods or in the presence of power such as a memory device.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

The display 200 will preferably include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

The power supply outputs a particular voltage to a device or component or components of a device. The power supply could be a direct current ("DC") power supply (e.g., a battery), an alternating current ("AC") power supply, a linear regulator, etc. The power supply can be configured with a microcontroller to receive power from other grid-independent power sources, such as a generator or solar panel.

With respect to batteries, a dry cell battery may be used. Additionally, the battery may be rechargeable, such as a lead-acid battery, a low self-discharge nickel metal hydride battery ("LSD-NiMH"), a nickel—cadmium battery ("NiCd"), a lithium-ion battery, or a lithium-ion polymer ("LiPo") battery. Careful attention should be taken if using a lithium-ion battery or a LiPo battery to avoid the risk of unexpected ignition from the heat generated by the battery. While such incidents are rare, they can be minimized via appropriate design, installation, procedures and layers of safeguards such that the risk is acceptable.

The power supply could also be driven by a power generating system, such as a dynamo using a commutator or through electromagnetic induction. Electromagnetic induction eliminates the need for batteries or dynamo systems but requires a magnet to be placed on a moving component of the system.

The power supply may also include an emergency stop feature, also known as a "kill switch," to shut off the machinery in an emergency or any other safety mechanisms known to prevent injury to users of the machine. The emergency stop feature or other safety mechanisms may need user input or may use automatic sensors to detect and determine when to take a specific course of action for safety purposes.

In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

ISO 11783, known as Tractors and machinery for agriculture and forestry—Serial control and communications data network (commonly referred to as "ISO Bus" or "ISOBUS") is a communication protocol for the agriculture industry based on the SAE J1939 protocol (which includes CAN bus). The standard comes in 14 parts: ISO 11783-1: General standard for mobile data communication; ISO 11783-2: Physical layer; ISO 11783-3: Data link layer; ISO 11783-4: Network layer; ISO 11783-5: Network management; ISO 11783-6: Virtual terminal; ISO 11783-7: Implement messages application layer; ISO 11783-8: Power train messages; ISO 11783-9: Tractor ECU; ISO 11783-10: Task controller and management information system data interchange; ISO 11783-11: Mobile data element dictionary; ISO 11783-12: Diagnostics services; ISO 11783-13: File server; ISO 11783-14: Sequence control.

Ethernet is a family of computer networking technologies commonly used in local area networks ("LAN"), metropolitan area networks ("MAN") and wide area networks ("WAN"). Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Ethernet was first standardized under the Institute of Electrical and Electronics Engineers ("IEEE") 802.3 working group/collection of IEEE standards produced by the working group defining the physical layer and data link layer's media access control ("MAC") of wired Ethernet. Ethernet has since been refined to support higher bit rates, a greater number of nodes, and longer link distances, but retains much backward compatibility. Ethernet has industrial application and interworks well with Wi-Fi. The Internet Protocol ("IP") is commonly carried over Ethernet and so it is considered one of the key technologies that make up the Internet.

The Internet Protocol ("IP") is the principal communications protocol in the Internet protocol suite for relaying datagrams across network boundaries. Its routing function enables internetworking, and essentially establishes the Internet. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information.

The Transmission Control Protocol ("TCP") is one of the main protocols of the Internet protocol suite. It originated in the initial network implementation in which it complemented the IP. Therefore, the entire suite is commonly referred to as TCP/IP. TCP provides reliable, ordered, and error-checked delivery of a stream of octets (bytes) between applications running on hosts communicating via an IP network. Major internet applications such as the World Wide Web, email, remote administration, and file transfer rely on TCP, which is part of the Transport Layer of the TCP/IP suite.

Transport Layer Security, and its predecessor Secure Sockets Layer ("SSL/TLS"), often runs on top of TCP. SSL/TLS are cryptographic protocols designed to provide communications security over a computer network. Several versions of the protocols find widespread use in applications such as web browsing, email, instant messaging, and voice over IP ("VoIP"). Websites can use TLS to secure all communications between their servers and web browsers.

In some embodiments, a device could include one or more communications ports such as Ethernet, serial advanced technology attachment ("SATA"), universal serial bus ("USB"), or integrated drive electronics ("IDE"), for transferring, receiving, or storing data.

In some embodiments, a satellite-based radio-navigation system such as the global positioning system ("GPS") is used. GPS is owned by the United States and uses satellites to provide geolocation information to a GPS receiver. GPS, and other satellite-based radio-navigation systems, can be used for location positioning, navigation, tracking, and mapping.

Referring back to FIG. 3, the display 200 includes a number of icons and toolbars, for example, the toolbar across the upper portion of the display 200 and the toolbar with icons along the right side of the display 200, which can lead to additional screens, which will provide more options and inputs.

Figure 4:
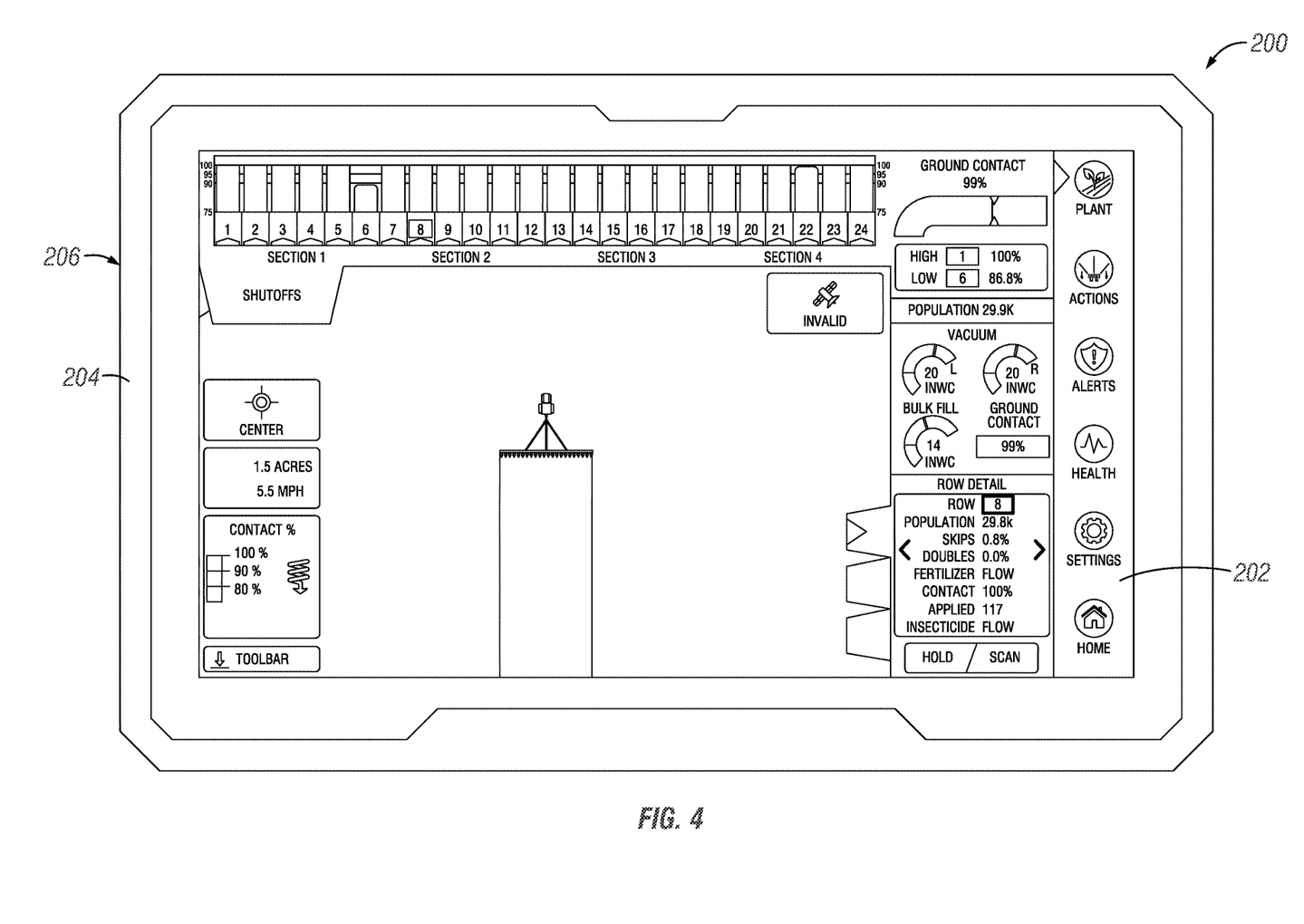
FIG. 4 an exemplary view of a display unit for use with an agricultural planting implement showing a planter moving through a field.

FIG. 4 is a depiction of the display 200 used during planting by a planting implement. The display screen 202 has changed to show a graphical depiction of a tractor and a planter moving through an exemplary field. A number of icons, sections, and other portions of the display screen 202 include information related to the planting and movement of the tractor and implement. This includes, but is not limited to, speed, heading, downforce information (contact %), row unit information, population, planting information, etc. This is in the form of numbers, text, percentages, colorized information, and combinations of the same. As will be understood, the screen 202 can be changed, such as per user preference, to selectively show desired information and to shuffle through various screens. Nonlimiting examples include that the user can look at issues/warnings that may be indicated by the system, can look at help guides and/or manuals for operation instructions, can look at field information, or can even make changes to one or more components of the planting system. For example, changes can be made to accommodate planting preferences, information shown/displayed, or to run diagnostics.

Figure 5:
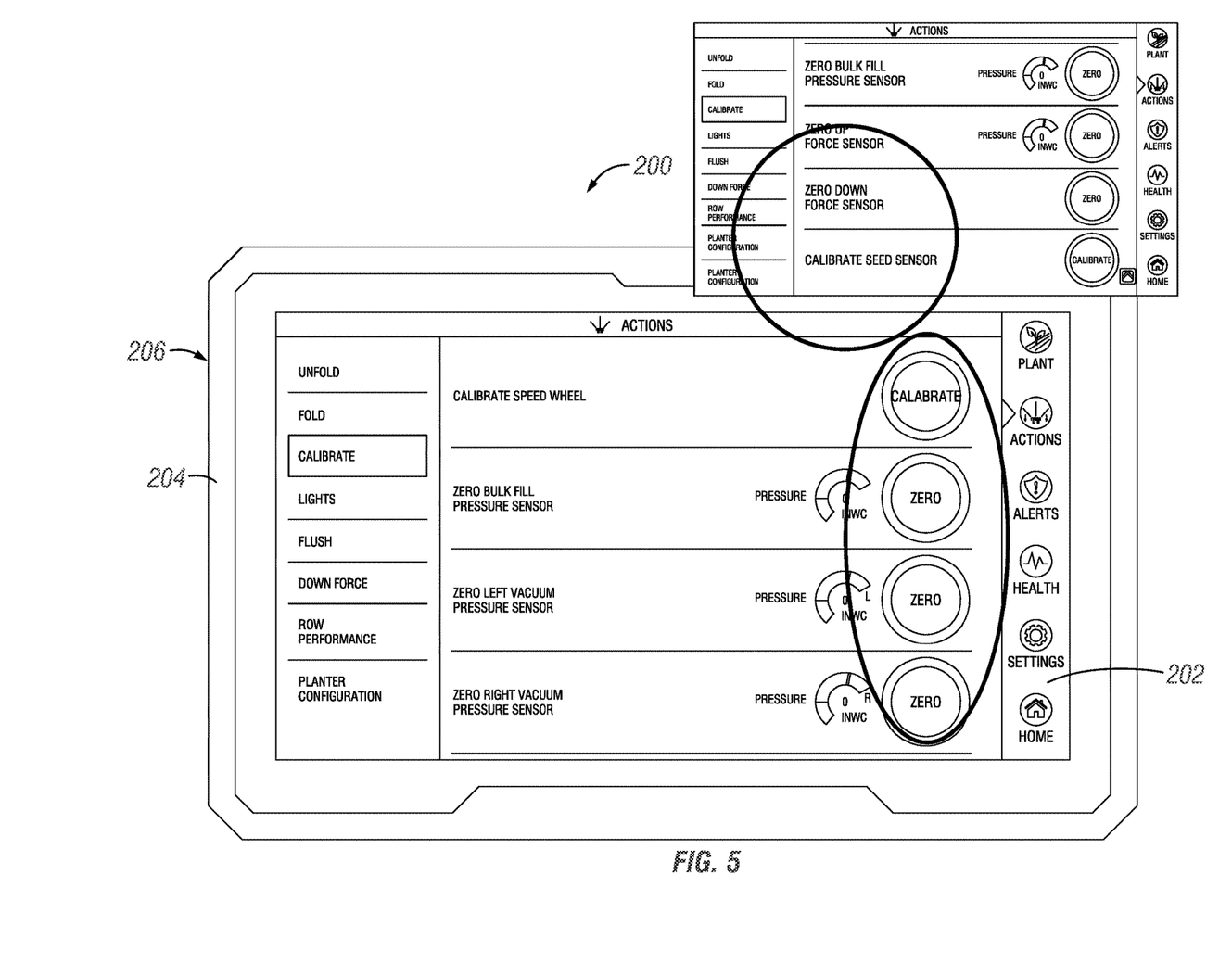
FIG. 5 is an exemplary view of a display unit showing the ability to calibrate one or more sensors associated with the planter.

One such diagnostical option that a user may choose is shown in FIG. 5. As noted, the planter includes a number of electrical components. These can include, for instance, sensors.

As noted, it is contemplated that a planter includes sensors and/or modules. Modules can be placed on and around the planter and include various sensors to provide information to an intelligent control. The sensors may include vision sensors, radar sensors, LIDAR sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, compaction, temperature, and the like. The sensors can also be location sensors to determine if the planter is on level ground, on a side hill, going up or down hill, etc. The location sensors can also determine areas in which the planter and/or implement are not to travel, based upon pre-determined and/or programmed data. The sensors can then indicate to actuators or other mechanisms on the planter to prevent the planter from rolling over, becoming stuck, running into an object, or otherwise putting the planter in an undesirable situation. The sensors could also be used with location determining systems, such as GPS. The combination of the sensors and location determination systems would allow a planter to travel to a location without running into obstructions, without running into other planters, without damaging planted or existing crops, as well as with obeying other rules, such as traffic regulations. The sensors and/or location determining systems would allow a planter to travel from one location to another, to locations within a field, or otherwise in combination with additional vehicles safely and precisely.

One or more sensors may be included with a row unit, such as to detect seed being planted by a row unit. The sensor may be in the seed meter, the seed conveyance system (seed-to-ground system), or otherwise included. For exemplary purposes, a sensor in a seed tube used to deliver seed from a meter to a furrow in the ground will be disclosed.

The seed sensor for the gravity drop seed tube is in the elements. Thus, the sensor can be exposed to soil and other materials as the planter moves through the field. The sensor, which may be a light-based sensor, can be affected by the build up of soil or other material on one or more portions of the sensor. For example, build up on the transmitter, receiver, and/or transceiver, may affect the ability to detect seed and/or determine the difference between seed passing by the sensor and other material, such as soil, fertilizer, or the like. To account for this buildup, the sensor may self-adjust to take into account the buildup. This can be in the form of increasing or decreasing sensitivity levels, or to adjust the amount of information required to determine material passing thereby. This can continue until such time that an operator or user is able to clean off (wipe) the surfaces of the sensor components.

However, an issue may also occur once the sensor components are cleaned of the buildup. As noted, the sensor has self-adjusted to account for the buildup. Once the buildup has been cleansed, the clean sensor may not be calibrated accordingly, and thus, may include errors in the signals.

Therefore, some aspects and/or embodiments of the invention provide for the calibration of one or more sensors of the agricultural planting implement via the display 200. As shown in FIG. 5, one of the levels and screens of the display system, which is under the "Actions" icon along the right hand side of the display 200, is the ability to calibrate a seed sensor that may be located in a gravity seed tube. The calibration can take place after the sensors have been manually cleaned or wiped to remove some, substantially all, or all of the buildup on one or more components of the sensor. The calibration will allow the sensor to determine the sensitivity level required to sense seeds, which may need to be reduced if it has increased due to the buildup of soil or other debris on the portions of the sensor. Without calibrating, the sensitivity levels may be higher than preferred, which could affect the determination of seed, particulate material, soil or other debris, or the like (duplicates, slugs, etc.), which could affect the overall performance of the planting implement.

According to at least some embodiments and/or aspects, the general flow and or method for calibrating one or more seed sensors may be as follows:

1. Soil, debris, dust, etc. builds upon one or more components of the seed sensor, which causes the sensor to increase its sensitivity levels to be able to determine one or more seeds being detected.

2. A user/operator, goes through standard preventive maintenance and/or cleaning of the planter, which includes cleaning portions of the seed sensor(s).

3. Before next planting, the user/operator toggles through the display 200, such as via the "ACTIONS" icon screens, to arrive at FIG. 5, where they activate the calibration of the sensor(s) via interaction of the "CALIBRATE" input adjacent the "CALIBRATE SEED SENSOR" descriptor (see, inlet figure of FIG. 5).

4. The system activates one or more seed sensors in the gravity seed tubes, such as at all of the row units or a selected subset thereof. This activation calibrates the sensors by determining the proper sensitivity level needed, based upon the cleanliness of one or more of the transmitter, receiver, and/or transceiver. For example, a known signal with known results (e.g., light wave sent with expected time for return) is utilized, wherein the sensitivity is adjusted until the expected result is met.

5. The system then provides an all clear output on the display 200, indicating that the sensor(s) has been calibrated and is ready to be used.

Thus, the ability to calibrate the sensor for the seed tubes can be quickly and easily accomplished in a remote manner, such as by interaction with the display 200.

Figure 6:
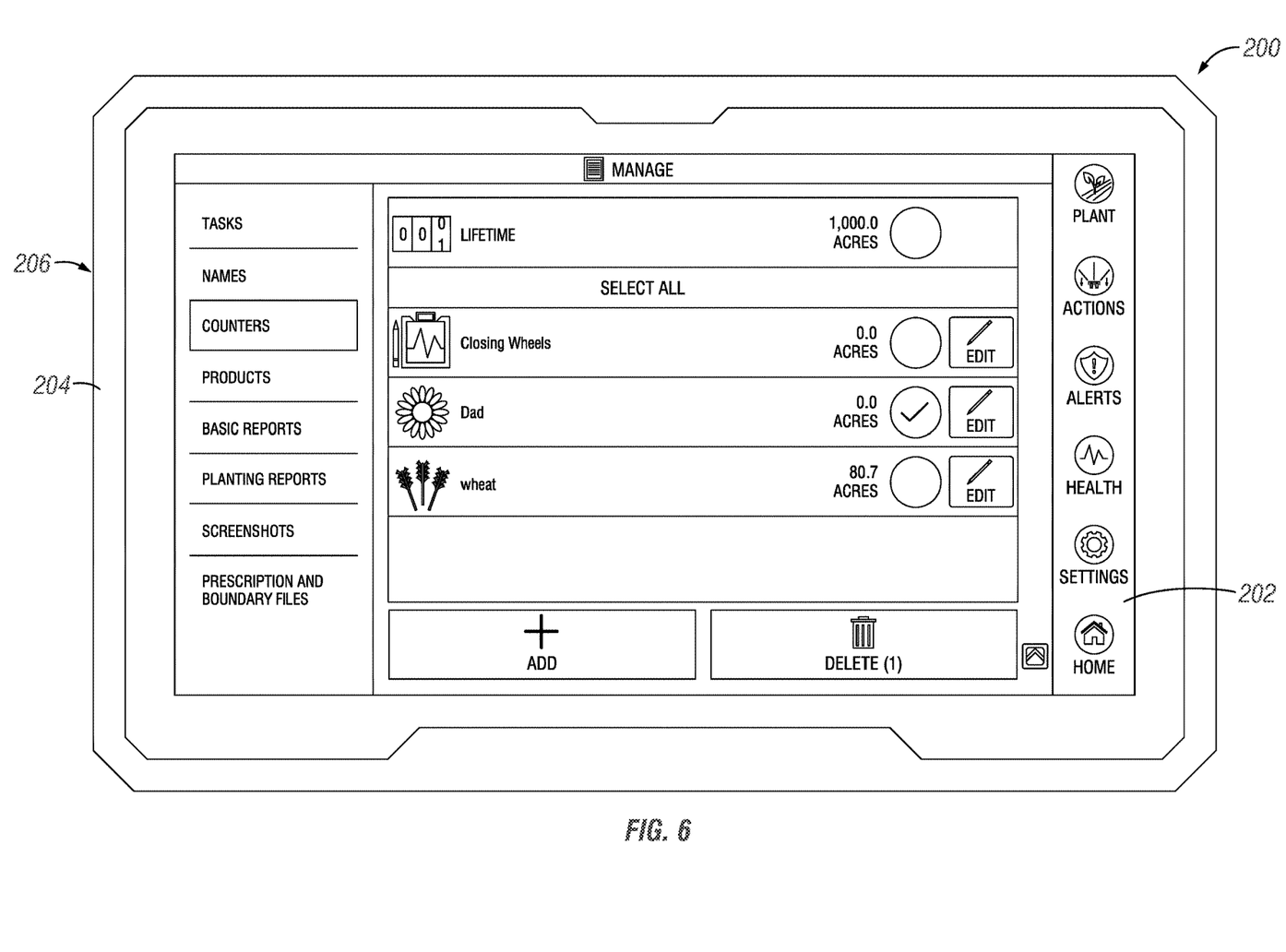
FIG. 6 is an exemplary view of a display unit with customizable categories that can track values such as the number of acres planted by category.
Figure 7:
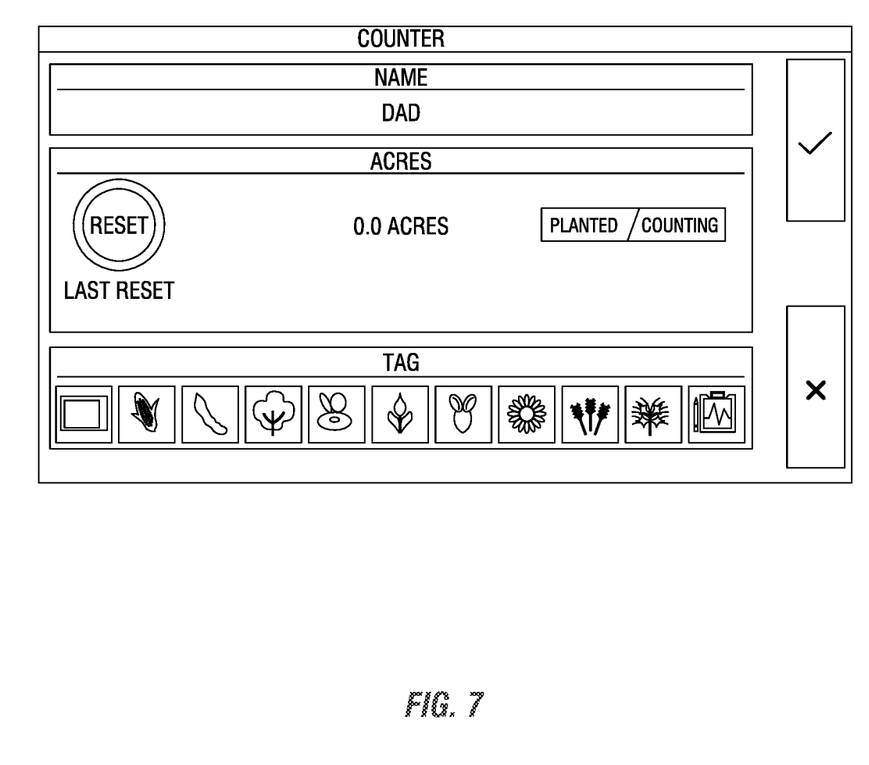
FIG. 7 is an exemplary view of a portion of a display unit showing customizable categories.
Figure 8:
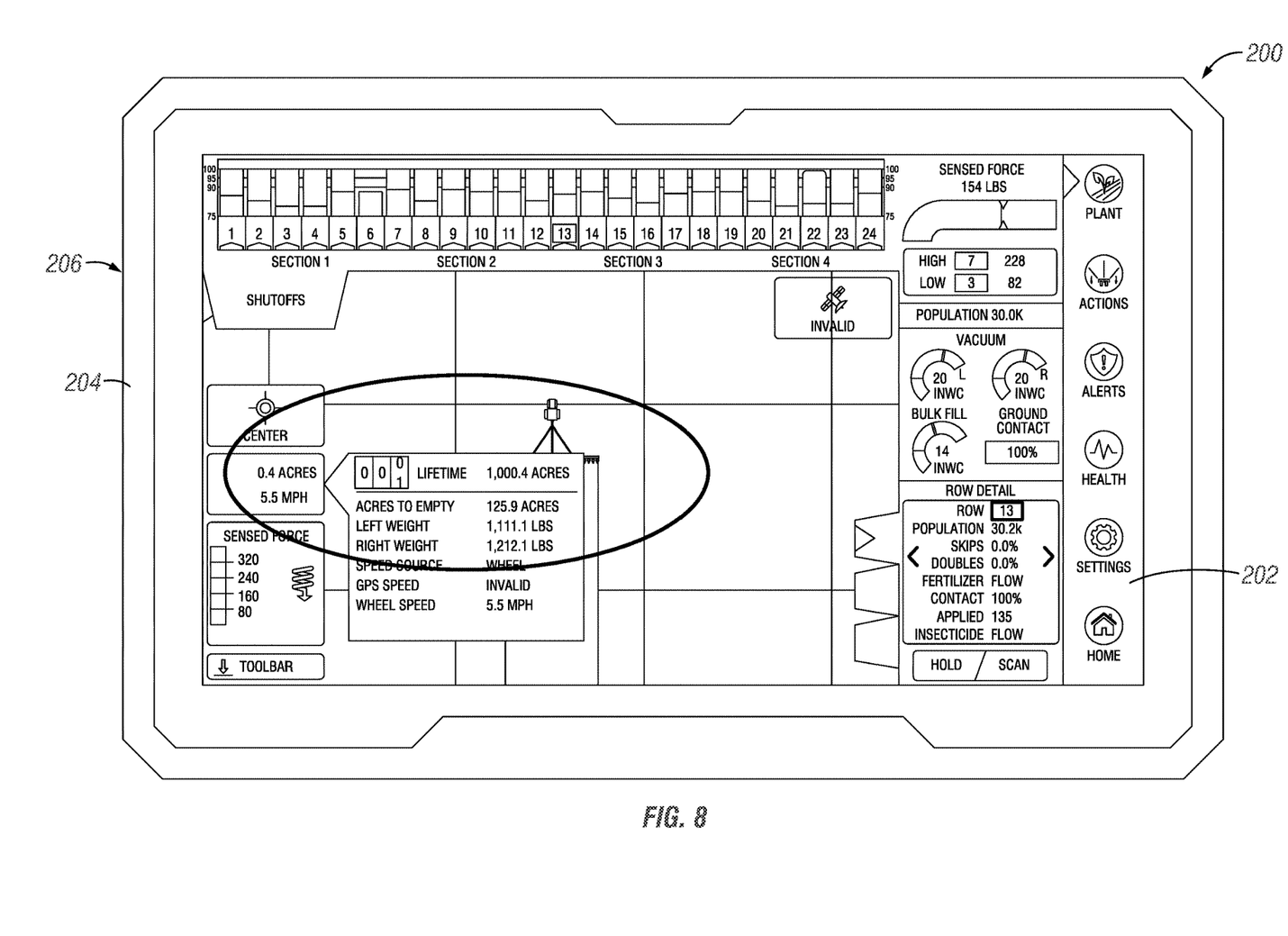
FIG. 8 is an exemplary view of a display unit for use with an agricultural planting implement showing some customizable displays.

Yet another feature of the display system, such as that shown in the figures, is shown in FIGS. 6-8. The figures show an ability for the system, via a combination of a number of inputs, tracking, memory, databases, and the like, to track a category associated with the agricultural implement. For example, it is contemplated that the system be able to track one or more categories over a period of time to accumulate a value, such as a numerical or empirical value, associated with one or more tasks. This can also include a tracking of a value over time and who may be aggregating the value over the time, as will be understood with respect to the various examples and other exemplary description provided herein. Accordingly, the system may provide a way to capture and categorize the aggregation, such as the counting, of a value associated with the implement. As shown in FIG. 6, the value being counted may be a number of acres that have been planted with respect to a selected category. Keeping track of the amount of time, such as the hours operated, of an implement has been known and is one way to track performance and to keep tabs of maintenance, such as when to perform different preventive maintenance tasks for a given implement. However, according to the aspects and/or embodiments provided, the counted values may provide additional information that may be useful for multiple reasons, including, but not limited to, maintenance issues, number of types of crop planted, number of other inputs applied on an acre basis, number of acres planted by a selected person, or a combination of the tracking, in terms of aggregated acres, of the selected items. Such information could be reviewed, such as after the planting season, to attempt to glean information that could be used for future purposes. As will be understood, this could include, but is not limited to, optimizing human performance to determine the amount of work (acres) a selected person has worked for a given planting season, optimizing the amount of a crop or other input, using historical data to make future decisions (amount of seed or other particulate material needed based upon number of acres counted), planned maintenance, troubleshooting of an issue based upon number of acres for a component, system, or the like, as well as any other takeaway that may be gleaned from reviewing the number of acres associated with a category, such as person, machine, crop, tow vehicle, soil type, elevation level, temperature/climate, machine component, or the like.

Therefore, to setup such a configuration, the display 200 is interfaced to reach the "MANAGE" section. As shown in FIG. 6, there are a number of options in the MANAGE section, including "COUNTERS" along the left hand side. Accessing the COUNTERS selection allows a user to set up/add any number of categories in which to track with respect to the number of acres planted. As noted, the system can include a number of preset categories. These categories can include, but are not limited to, number of acres operated/planted by people/operators, number of acres of crop type planted, number of acres planted with particular planter components, number of acres for a particular tractor/planter combination, number of acres planted in different weather conditions, soil types, elevation levels, or other environment, or the like.

Once the category has been chosen, the title of the category can be identified and personalized. For example, as shown in FIG. 6, three counters have been set up. A machine component category has been set up and identified as "Closing Wheels". This will count the number of acres that the closing wheels are used for planting. A second category is a person/operator category and labeled "Dad". This will track and count the number of acres the user identified as "Dad" will plant with the system. A third category is a crop type and labeled "Wheat". This will track the number of acres the planter has planted wheat. It is noted that the wheat category has 80.7 acres, indicating the number of acres of wheat planted thus far. The "Dad" and "Closing Wheels" has zero acres, indicating that the dad has not planted yet and the closing wheels have not yet been used.

As shown in FIG. 7, another sub-screen is shown that shows the ability to reset the counters at any time. This zeros out the selection, and also shows a detailed screen that is used to select a particular icon to use during setup of one of the categories. As shown along the bottom of FIG. 7, a number of icons are provided that can be used to identify the category being tracked and counted with respect to the number of acres planted.

As noted, once the planting season or other operational season has concluded, the information obtained and tracked by the counters can be saved in a database or other form of memory. This can then be sent for printing, review, or to a separate farm management system. In addition, the information acquired can be reviewed and analyzed for many different purposes, both agronomical and/or otherwise. For example, the people category can be used to see who planted different numbers of acres, which could be used to address the abilities and performance of workers. The types of crops planted in acres could be used for agronomic and/or economic purposes, such as to determine a return on investment, plan ahead for future seasons, determine relationships between crops planted and other information (who planted, where, climate/environment considerations, etc.), and the like.

Still further, the counters can be viewed, in real time, via the display 200. This is shown in FIG. 8. FIG. 8 shows a depiction of a planter moving through a field via the display 200. When selected, a popup, such as the popup disclosed in U.S. Ser. No. 62/706,818, filed Sep. 11, 2020, which is hereby incorporated by reference in its entirety, is shown on the screen 202 of the display 200. The popup includes a number of values associated with planting. One of the values can be the number of acres planted according to one or more of the selected categories that had been set up in the MANAGE section, to track in real time, the number of acres planted for the category.

Figure 9:
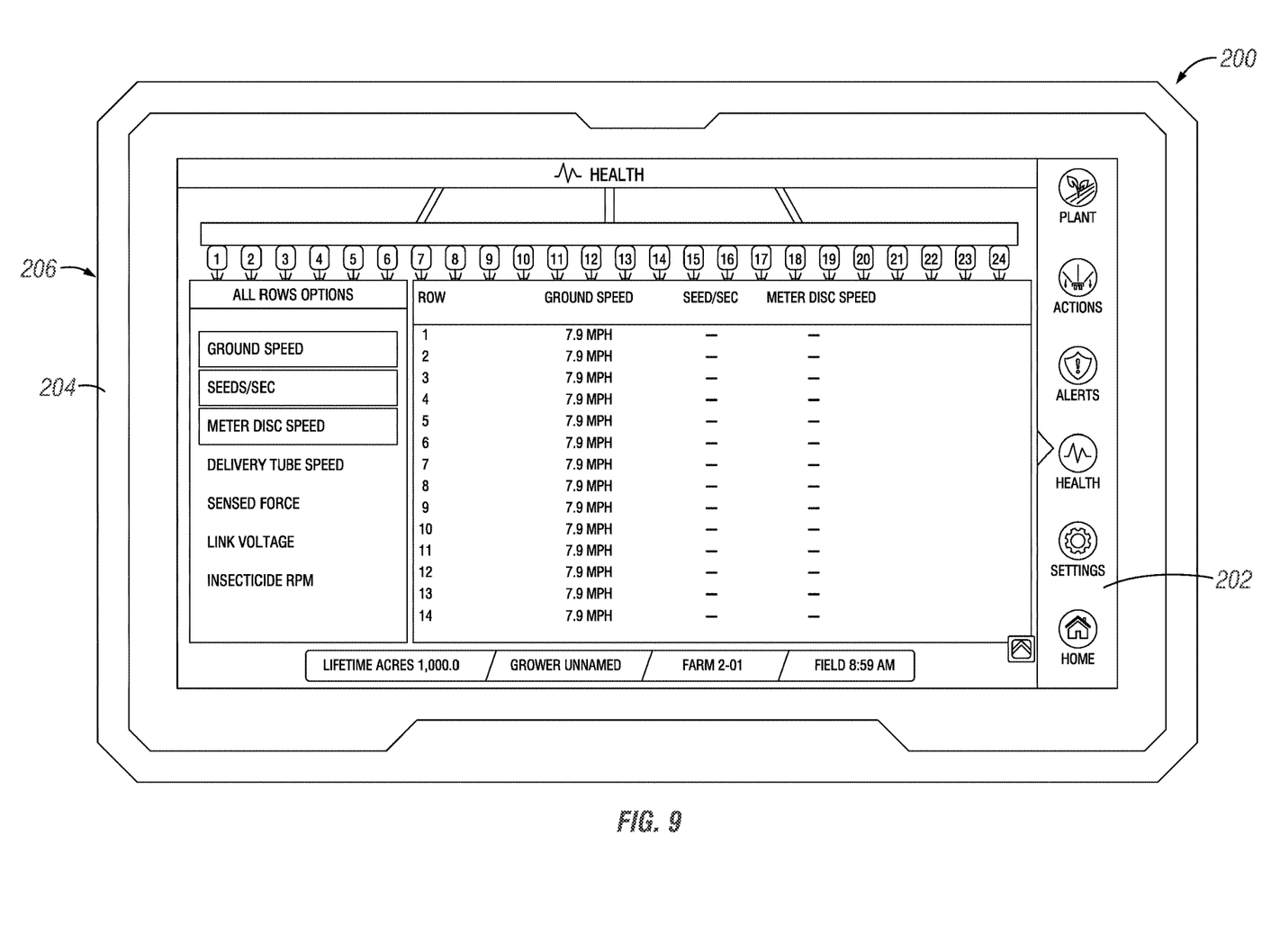
FIG. 9 is an exemplary view of a display unit for use with an agricultural planting implement showing selectable selections for viewing on the display unit during planting.

FIG. 9 shows additional aspects of the system. As noted, the display 200 can show any number of selected values at a time, such as during planting. As a default, certain values will be shown upon planting with the system. However, there may be times or preferences for the showing of different types of data to be shown. The screen 202 shown in FIG. 9 provides a way to set up such a personalized configuration. For example, FIG. 4 shows exemplary information that may be shown on a screen 202 of the display 200 during planting. However, FIG. 9 shows multiple additional values, categories, and/or information that may be selected to be shown on the display 200, per selection by a user.

Such information includes a number of possible outputs. According to at least some aspects and/or embodiments, a user may be able to select a predetermined number, such as five, of the selections, upon which the corresponding values will then be shown on the screen 202 during planting or other operation. The values are shown to be related to the row units of the ground-engaging elements of the row units, such as meters and other components for planting seed. However, it should be appreciated that generally any types of information can be selected.

Additional aspects of the system include methods and/or systems for operation of one or more components of the planter. In some planters, the seed conveyor for delivering seed to the ground from a seed meter includes a rotational member, such as a belt or other endless member that can be timed and sped to release seed with a horizontal component that is substantially equal and opposite to a horizontal speed component of the planter.

In such a configuration, there are multiple moving components of the row unit. For example, the seed meter may be rotating to meter and singulate seed, which are then transported, conveyed, guided, or otherwise transferred to the belt. If there is an issue with the belt, the seed from the meter may not stop providing singulated seed, which can become backed up or otherwise overpopulated. Going unnoticed could cause harm to one or more components of the planter.

Therefore, aspects and/or embodiments disclosed provide for a system that monitors the operation of the belt and is able to shut down one or more components based upon a noted issue of the belt. For example, if the belt is determined by the system to become stalled, the belt may not be able to rotate and deliver seed. Upon notice of stalling, the system can automatically shut down the operation of the seed meter associated with the stalled belt, which would mitigate delivery of seed to the stalled belt.

Concurrently, the system could notify a user or users, via one or more alerts on one or more displays, of the stall and shutdown, which would indicate a need to look into and troubleshoot the row unit(s) of the planter.

For example, the alert could go to the display in the tow vehicle (tractor) towing the associated planter, as well as any other displays connected to the system. This could be in other tractor/planter systems, other handhelds, service centers, or other servers or databases that may track issues associated with or managing the members of the system.

Still further, the system can identify other issues associated with one or more components of the planter, including the moving components, sensors, motor controllers, identifiers, or the like, and can effect change in associated components based upon a determined issue with the system.

From the foregoing, it can be seen that the invention accomplishes at least all of the stated objectives.

It should be appreciated that one or more alternatives, variations, additions, subtractions, or other changes, which may be obvious to those skilled in the art, to be considered a part of the present disclosure.

What is claimed is:

1. A computer-implemented self-calibration system for use with an agricultural implement, the system comprising:
   one or more agricultural sensors located on the agricultural implement; and
   a display in communication with the agricultural implement and/or the one or more agricultural sensors, wherein a user can offer input to the display to calibrate the one or more agricultural sensors;
   wherein, upon input to calibrate the one or more agricultural sensors being offered via the display, the system calibrates the one or more agricultural sensors.

2. The system of claim 1, wherein the agricultural implement is a planter comprising a plurality of row units, each row unit comprising a seed meter, and each seed meter comprising a seed tube, wherein the one or more agricultural sensors are located in the plurality of seed tubes and are used to detect seed being planted.

3. The system of claim 1, wherein the display is and/or comprises an intelligent control and/or a user interface.

4. The system of claim 1, wherein the one or more agricultural sensors are included as part of one or more modules located on the agricultural implement.

5. The system of claim 1, wherein the system is adapted to calibrate all of the one or more agricultural sensors or a selection of the one or more agricultural sensors, wherein the user may select the selection via the display.

6. The system of claim 1, wherein the system further comprises a tow vehicle, such as a tractor, to tow the agricultural implement.

7. The system of claim 1, wherein after the one or more agricultural sensors have been calibrated, the system is adapted to provide an output to the display indicating that the one or more agricultural sensors have been calibrated and/or are ready to be used.

8. The system of claim 1, wherein the system is adapted to determine one or more proper sensitivity levels needed by each of the one or more agricultural sensors for each of the agricultural sensors to function properly, further wherein each of the agricultural sensors comprises a transmitter, receiver, and/or transceiver, and each of the proper sensitivity levels needed by each of the agricultural sensors is based on the cleanliness of one or more of each of the one or more of the transmitters, receivers, and/or transceivers.

9. The system of claim 1, wherein the system is adapted to adjust a sensitivity level of each of the one or more agricultural sensors until an actual result of each agricultural sensor matches an expected result of each agricultural sensor.

* * * * *